United States Patent [19]

Steppan et al.

[11] Patent Number: 5,502,150

[45] Date of Patent: Mar. 26, 1996

[54] LINEAR HDI URETHANE PREPOLYMERS FOR RIM APPLICATION

[75] Inventors: David D. Steppan, Gibsonia; Ronald A. Cageao, Beaver; Neil H. Nodelman, Pittsburgh, all of Pa.; William E. Slack, Moundsville, W. Va.; Frank Sanns, Jr., Pittsburgh, Pa.

[73] Assignee: Bayer Corporation, Pittsburgh, Pa.

[21] Appl. No.: 267,732

[22] Filed: Jun. 29, 1994

[51] Int. Cl.$^6$ .................................................. C08G 18/10
[52] U.S. Cl. ........................... 528/60; 521/119; 521/126; 521/127; 521/128; 521/159; 528/52; 528/55; 528/58; 528/76
[58] Field of Search .................... 528/60, 76, 52, 528/55, 58; 521/119, 126, 127, 128, 159

[56] References Cited

U.S. PATENT DOCUMENTS

| | | | |
|---|---|---|---|
| 4,218,543 | 8/1980 | Weber et al. | 521/51 |
| 4,269,945 | 5/1981 | Vanderhider et al. | 521/159 |
| 4,413,111 | 11/1983 | Markusch et al. | 528/59 |
| 4,598,103 | 7/1986 | Chang | 521/126 |
| 4,642,320 | 2/1987 | Turner et al. | 521/176 |
| 4,764,543 | 8/1988 | Savina | 521/160 |
| 4,772,639 | 9/1988 | Pilger et al. | 521/124 |
| 4,937,366 | 6/1990 | Nodelman | 521/163 |
| 5,036,118 | 7/1991 | Martinez | 523/212 |
| 5,106,874 | 4/1992 | Porter et al. | 528/64 |
| 5,260,346 | 11/1993 | Cassidy et al. | 521/159 |

*Primary Examiner*—James J. Seidleck
*Assistant Examiner*—R. F. Johnson
*Attorney, Agent, or Firm*—Joseph C. Gil; N. Denise Brown

[57] ABSTRACT

The present invention is directed to polyurethane moldings produced via the RIM process. These polyurethane moldings have excellent reactivity, demold properties (at a 30s demold), and good elongation and tear strength, and comprise the reaction product of an HDI prepolymer having an NCO content of 5 to 25%, a functionality of less than 2.3, and a monomer content of less than 10%, with an isocyanate-reactive component comprising b1) at least one relatively high molecular weight organic compound containing at least about two isocyanate-reactive hydroxyl groups; b2) at least one relatively low molecular weight organic compound selected from the group consisting of diols, aminoalcohols, and mixtures thereof; and b3) at least one relatively low molecular weight hydroxyl-based crosslinking compound containing no more than one aliphatic amine hydrogen atoms capable of reacting with isocyanate groups; in the presence of at least one catalyst.

14 Claims, No Drawings

5,502,150

LINEAR HDI URETHANE PREPOLYMERS FOR RIM APPLICATION

BACKGROUND OF THE INVENTION

The present invention relates to a process for the production of polyurethane moldings from a reaction mixture via the RIM process. The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates, such as, for example, diphenyl methane-4,4'-diisocyanate (i.e. MDI). Various patents such as, for example, U.S. Pat. No. 4,937,366, broadly disclose aliphatic isocyanates in a long list of isocyanates which are said to be suitable for use in a RIM process. However, very few of the patents which disclose that aliphatic isocyanates are suitable for use in a RIM process have any working examples wherein an aliphatic isocyanate is used. The RIM examples of U.S. Pat. No. 4,937,366 are all based on a prepolymer of an aromatic isocyanate.

High productivity commercial RIM processes require a 30s demold time, and prefer mold temperatures less than 80° C. for worker safety and energy efficiency. These are briefly described in U.S. Pat. No. 4,937,366. The RIM examples of this reference have a mold temperature of 65° C. and a demold time of 35 seconds.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanato-hexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. However, the reference requires unusually long demold times, i.e. from 3–10 minutes. These demold times are not commercially acceptable for high speed RIM production.

IPDI has NCO groups of differing reactivity due to steric hindrances. The first NCO group reacts much more quickly than the second NCO group. This fact requires higher mold temperatures and/or longer demold times for RIM systems based on IPDI. Demold times of 3–10 minutes are disclosed by U.S. Pat. No. 4,772,639.

In addition, U.S. Pat. No. 4,772,639 clearly requires that at least 10% by weight of the IPDI monomer be used. This is not attractive from a physiological viewpoint.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) an aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. The isocyanate used in the examples contains at least 39% by weight of HDI monomer. Although the reference discloses aliphatic isocyanates are suitable for this process, the mold temperatures are higher than normal, i.e. at least 90° C., and the demold times range from about 1–5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers. All of the working examples of this patent use methylene bis(4-cyclohexylisocyanate) which is difunctional, and 100% monomer. The present invention is directed to a method of obtaining fast reacting RIM systems based on urethane or urethane/urea technology with slower reacting OH terminated soft segments and extenders and slower reacting aromatic polyamine extenders. An advantage of the presently claimed systems over total polyurea systems is their improved flow characteristics during mold filling.

RIM systems are also disclosed in U.S. Pat. No. 4,269,945. These systems are based on compositions comprising a polyisocyanate, a polyol, and a specific chain extender. The specific chain extender comprises (1) at least one component selected from the group consisting of (a) a hydroxyl-containing material which is essentially free of aliphatic amine hydrogen atoms, and (b) aromatic amine-containing materials containing at least two aromatic amine hydrogen atoms and are essentially free of aliphatic amine hydrogen atoms; and (2) at least one aliphatic amine-containing material having at least one primary amine group and an average aliphatic amine hydrogen functionality of from about 2 to 16. All of the working examples in this patent use aromatic isocyanates that may be polymeric in nature. Demold times of 60 seconds are disclosed for the examples even though comparatively faster reacting aromatic isocyanates are used.

The present invention has several advantages over these references. Amine terminated polyethers (ATPE's) are comparatively expensive. Accordingly, the cost of RIM systems which are based primarily on ATPE's is significantly more than the cost of RIM systems which use conventional hydroxy group containing materials. The present systems are more economical in terms of cost as they use smaller quantities of, if any, amine-terminated polyethers. It is also possible to adjust the catalyst level of the present systems to fit the specific processing needs of various applications. These RIM systems have a wider processing window since the catalyst level allows one to tailor system reactivity for particular mold and padweight. In addition, these systems have a 30 second demold time with good greenstrength making them suitable for commercial RIM production.

In addition, certain preferred embodiments of the present invention have another advantage, i.e. isocyanates with a low monomer content are used. From an environmental and industrial hygiene viewpoint, this means lower risk is associated with the handling of the products.

DESCRIPTION OF THE INVENTION

The present invention relates to polyurethane molding produced via the RIM process. These polyurethane moldings have excellent reactivity, demold properties and good elongations and tear strengths (at a 30s demold), and comprise the reaction product of A) a hexamethylene diisocyanate prepolymer having a functionality of less than 2.3, an NCO content of 5 to 25, and a monomer content of less than 10%; with B) an isocyanate-reactive component comprising: b1) at least one relatively high molecular weight organic compound containing at least about two isocyanate-reactive hydroxyl groups, b2) at least one relatively low molecular weight organic compound selected from the group consisting of diols, aminoalcohols, and mixtures thereof, and b3) at least one relatively low molecular weight hydroxyl-based crosslinking compound having a functionality greater than 2, and containing no more than 1 aliphatic amine hydrogen atom capable of reacting with isocyanate groups; in the presence of C) at least one catalyst. The amount of component B) and component C) totals 100%, and the components are processed via the one-shot process at an isocyanate index of 70 to 130.

In particular, the present invention is directed to a process for the production of polyurethane moldings from a reaction mixture via the reaction injection molding process wherein the reaction mixture comprises the following components:

A) a hexamethylene diisocyanate prepolymer having a functionality of less than 2.3, an NCO content of 5 to 25%, and a HDI monomer content of less than 10% by weight; with B) an isocyanate-reactive component comprising:

b1) from about 20 to 94% by weight, based on the weight of component B) and component C), of at least one organic compound having a molecular weight of from 500 to 10,000, and containing at least about two, preferably from about two to three isocyanate-reactive hydroxyl groups, b2) from about 5 to 50% by weight, based on the weight of component B) and component C), of at least one organic compound having a molecular weight of from about 61 to 500, and being selected from the group consisting of diols, aminoalcohols, and mixtures thereof, and b3) from about 1 to 20% by weight, based on the weight of component B) and component C), of at least one hydroxyl-based crosslinking compound having a functionality greater than 2, a molecular weight of from about 92 to 500, and containing no more than I aliphatic amine hydrogen atom capable of reacting with isocyanate groups;

in the presence of

C) from 0.1 to 10% by weight, based on the weight of component B) and component C), of at least one catalyst, wherein the amount of component B) and component C) totals 100%, and the components are processed via the one-shot process at an isocyanate index of 70 to 130, preferably 85–115.

In a preferred embodiment of the invention, the catalyst comprises:

c1) from 0.1 to 10% by weight of at least one catalyst selected from the group consisting of metal carboxylates, metal halides, ammonium carboxylates, and mixtures thereof, c2) from 0.0 to 10% by weight of at least one tin-sulfur catalyst, and c3) from 0.0 to 10% by weight of at least one tertiary amine catalyst;

wherein the amount of components c1), c2) and c3) total 0.1 to 10% by weight, based on the weight of component B) and component C).

The catalyst composition most preferably comprises from 0.5 to 5.0% by weight of component c1); from 0.0 to 5.0% by weight of component c2); and from 0.0 to 5.0% by weight of component c3), wherein the amount of components c1), c2) and c3) total 0.5 to 5% by weight, based on the weight of component B) and component C).

The embodiment wherein the reaction mixture additionally comprises antioxidants and/or UV stabilizers has been found to have special advantages for certain uses of these molded products. These elastomers have enhanced weathering performance which is advantageous for unpainted outdoor applications.

It has been found that this particular combination of materials gives excellent processing on RIM equipment, and results in molded parts having short demold times with excellent greenstrength and good final tear properties. This is very surprising since the demold times were 30s, which is typical of fast reacting systems based on aromatic isocyanates and not thought to be attainable with systems based on aliphatic isocyanates and glycol and/or aminoalcohol chain extenders.

In accordance with the present invention, the isocyanate prepolymer is the reaction product of hexamethylene diisocyanate with a suitable hydroxyl group containing compound. Suitable hydroxyl-group containing compounds include compounds such as, for example, propylene glycol, diethylene glycol, triethylene glycol, neopentyl glycol, 1,3-butanediol, tripropylene glycol, 2,2,4-trimethylpentanediol and dipropylene glycol. Of these hydroxyl-group containing compounds, neopentyl glycol, 1,3-butanediol, tripropylene glycol, 2,2,4-trimethylpentanediol and dipropylene glycol are preferred.

It is also possible to use mixtures of lower functionality alcohols (f<2) with higher functionality alcohols (f>2), such as, for example, TMP and glycerin, provided that the final prepolymer functionality is less than 2.3. Higher molecular weight alcohols can also be used in combination with lower molecular weight alcohols provided that the specified monomer content, NCO content, and functionality of the prepolymer are met.

These prepolymers have a functionality of less than 2.3, preferably about 2; an NCO content of 5–25%, preferably 10–23%, and most preferably 15–21%; and a HDI monomer content of less than 10%, preferably less than 2%, and most preferably less than 1%. These prepolymers can be prepared, for example, over a temperature range of 25 to 200° C., with or without catalyst in a molar ratio of hydroxyl group containing compound to HDI of from about 1:2 to 1:50, preferably from about 1:3 to 1:50. The excess monomer is then removed. One suitable method for removing this excess monomer is by vacuum distillation which usually involves a first step flasher to remove the bulk of the excess monomer, followed by a wiped thin film evaporator.

In addition, it is also possible to prepare these prepolymers with more monomer, i.e. a molar ratio of greater than 1:50. The product will be the same and the excess isocyanate monomer will have to be removed. The amount of excess monomer used in the preparation of the prepolymer is limited only by economics.

Also necessary for preparing molded products via the RIM process is an isocyanate reactive component, i.e. component B). According to the present invention, component B) comprises b1) at least one high molecular weight compound containing at least about two, and preferably from about two to three isocyanate-reactive hydroxyl groups; b2) at least one low molecular weight organic compound selected from the group consisting of diols, amino alcohols, and mixtures thereof; b3) at least one hydroxyl-based crosslinking compound having a functionality greater than 2 and containing no more than 1 aliphatic amine hydrogen atom capable of reacting with isocyanate groups.

The isocyanate-reactive component B) to be used in the process according to the invention comprises components b1) at least one organic compound having a molecular weight of from 500 to 10,000 and containing at least about two isocyanate-reactive hydroxy groups. Examples of some suitable compounds to be used as component b 1 ) include, for example, the polyethers, polyesters, polythioethers, polyacetals, and polycarbonates containing from about 2 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component b1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

In another embodiment, the polyhydroxyl compound b 1) may additionally comprise: i) a dispersion of a polyurea and/or polyhydrazo-dicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschrifien 1,168,075 and 1,260,142, the disclosures of which are herein incorporated by reference, and in German Offenlegungsschrifien 2,324,134, 2,423,984, 2,512,385, 2,513,815, 2,550, 796, 2,550,797, 2,550,833, 2,550,862, 2,633,293, and 2,639, 254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Miles Inc. and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene, acrylonitrile, or both in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and, 29,118, and German Patent 1,152,536, the disclosures of which are herein incorporated by reference. Polymer polyols are commercially available from Bayer AG, BASF, and Arco.

The preferred PHD polyols include, for example, the polyurea of toluene diisocyanate and hydrazine dispersed in polyether polyol, and the preferred polymer polyols include, for example, those based on the monomers styrene and acrylonitrile.

The isocyanate-reactive component B) additionally comprises component b2) a low molecular weight organic compound having a molecular weight of from about 61 to 500, preferably from 61 to 400, and is selected from the group consisting of diols, amino alcohols, and mixtures thereof.

Suitable organic diols to be used as component b2) according to the invention include, for example, diols having a molecular weight of about 62 to 500, preferably about 62 to 400. These compounds include, for example, 2-methyl-1,3-propanediol, ethylene glycol, 1,2- and 1,3-propanediol, 1,3-and 1,4-and 2,3-butanediol, 1,6-hexanediol, 1,10-decanediol, diethylene glycol, triethylene glycol, dipropylene glycol, tripropylene glycol, neopentyl glycol, cyclohexanedimethanol, 2,2,4-trimethylpentane-1,3-diol, and mixtures thereof.

Suitable amine compounds to be used as component b2) according to the invention include organic amino alcohols having molecular weights of about 61 to 500, preferably about 61 to 400. Some examples of these compounds include monoethanolamine, monoisopropanolamine, mixtures thereof, and the like.

Preferred compounds for use as component b2) include, for example, 1,4-butanediol, 2-methyl-1,3-propanediol, and monoethanol-amine.

In addition, the isocyanate-reactive component B) also includes b3) at least one low molecular weight hydroxyl-based crosslinking compound, having a functionality greater than 2, a molecular weight of about 92 to 500, and containing no more than 1 aliphatic amine hydrogen atom capable of reacting with isocyanate groups. Examples of such compounds include, for example, diethanolamine, triethanolamine, and diisopropanolamine. Suitable compounds also include those such as ethylene diamine started propylene oxide polyethers.

The process of the invention also requires at least one catalyst capable of catalyzing the reaction between the isocyanate groups of A) and the isocyanate-reactive groups of B). It is preferred that the catalyst(s) is optimized both in terms of quantity and chemical composition so as to achieve a 30s demold time in the process.

In a preferred embodiment, the catalyst comprises c1) at least one catalyst selected from the group consisting of metal carboxylates, metal halides, ammonium carboxylates, and mixtures thereof. Of the metal halides, the metal chlorides are preferred. These catalysts may be used alone or in conjunction with c2) at least one tin-sulfur catalyst, and/or c3) at least one tertiary amine catalyst.

Some examples of catalysts suitable for use as c1) catalysts include metal carboxylates including, for example, tin carboxylates such as, for example, dimethyltin dilaurate, dibutyltin dilaurate and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e. Dabco TMR). Tin carboxylates such as, for example, dimethyltin dilaurate, and bismuth carboxylates such as, for example, bismuth trineodecanoate are preferred catalysts to be used as component c1). Metal chlorides such as, for example, dimethyltin dichloride are also preferred catalysts to be used as component c1).

Suitable compounds to be used as tin-sulfur catalysts c2) include, for example, dialkyltin dilaurylmercaptides such as, for example, dibutyltin dilaurylmercaptide and dimethyltin dilaurylmercaptide.

Suitable catalysts to be used as tertiary amine catalysts c3) include, for example, triethylamine, triethylenediamine, tributylamine, N-methylmorpholine, N-ethylmorpholine, triethanolamine, triisopropanolamine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 70 to 130 (preferably from 90 to 115). By the term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains the isocyanate reactive components and any other additives which are to be included.

The invention is further illustrated but is not intended to be limited by the following examples in which all parts and percentages are by weight unless otherwise specified.

EXAMPLES

The preparation of suitable HDI prepolymers for the present invention is shown in Examples 1–8.

Example 1

To a stirred reaction flask were added 900 grams of hexamethylene diisocyanate (HDI). The stirred HDI was heated to 70° C. and then 64.8 grams of neopentylglycol (NPG) were added. The reaction mixture was stirred at 70° C. until the urethane reaction was complete (about 6 hours). The resulting reaction mixture was cooled to give a 41.4% NCO. The excess monomer was removed by wiped thin film evaporation to yield a liquid having a viscosity of 1970 mPa.s at 25° C., an NCO content of 18.1%, and free monomer (HDI) content of 0.20%.

Examples 2 through 8

Examples 2 through 8 used the same procedure as outlined for Example 1. The materials used in these examples are as follows:

TMPD=2,2,4-trimethyl-1,3-pentanediol
1,3-XB=1.3-butanediol
PG=1,2-propanediol
DPG=dipropyleneglycol
TPG=tripropyleneglycol
DEG=diethyleneglycol
TEG=triethyleneglycol The results obtained in Examples 2–8 are as set forth in Table 1.

TABLE 1

| | | | | W.T.F.E.[B] Product | |
|---|---|---|---|---|---|
| Examples | Formulation, pbw | | Crude[A] % NCO | % NCO | Vics. @ 25° C., mPa · s | % HDI Monomer |
| 2 | 10.4 | TEG | 40.1 | 15.8 | Solid | 0.7 |
|   | 100  | HDI |      |      |       |     |
| 3 | 6    | 1,3-XB | 41.9 | 18.3 | 1360[C] | 1.8 |
|   | 100  | HDI |      |      |       |     |
| 4 | 10.1 | TMPD | 41.7 | 16.1 | 3470 | 0.1 |
|   | 100  | HDI |      |      |      |     |
| 5 | 13.3 | TPG | 39.2 | 15.1 | 1490 | 0.3 |
|   | 100  | HDI |      |      |      |     |
| 6 | 9.3  | DPG | 40.7 | 16.6 | 1660 | 0.2 |
|   | 100  | HDI |      |      |      |     |
| 7 | 5.3  | PG  | 42.1 | 18.0 | Solid | 0.3 |
|   | 100  | HDI |      |      |       |     |
| 8 | 7.4  | DEG | 41.4 | 19.7 | Solid | 7.3 |
|   | 100  | HDI |      |      |       |     |

A: % NCO of urethane before removal of excess HDI.
B: W.T.F.E. = wiped thin film evaporation.
C: Slowly solidifies on standing at 20° C.

RIM Examples 9–16:

The following general procedure was used in Examples 9–16.

Example 9:

A B-side mixture was prepared by blending 69 parts by weight (pbw) of Polyol A, 17 pbw Diol A, 4 pbw MEOA, 4 pbw Pigment B, 1 pbw Irganox 245, 3 pbw Tinuvin 765 and 2 pbw Catalyst A together and thoroughly mixed. They were put into the B-side of a Hennecke RIMDOMAT RIM machine. The appropriate quantity of Isocyanate A to achieve an isocyanate index of 105 was loaded into the A-side. The RIMDOMAT was equipped with a Hennecke mq8 Mixhead. The B-side was preheated to 40°–45° C. and the A-side was heated to 55°–60° C. The materials were injected at a 105 isocyanate index at an injection pressure of 200 bar and an injection rate of 200 grams/sec. The material was injected into a flat plaque mold of 3×200×300 mm heated to 65° C., and sprayed with Chemtrend RCTW 2006 mold release spray. After a 30s dwell time, the part was demolded. Physical properties were determined in accordance with ASTM standards. Other RIM examples were performed in an identical manner, except for the pbw of various components.

ASTM methods used were as follows:

| D790 | flexural modulus |
|---|---|
| D412 | tensile strength; and elongation |
| D624 | die C tear strength |

The following components were used in Examples 9–16
Polyol A: a glycerin started propylene oxide/ethylene oxide polyether (83 wt. % PO, 17 wt. % EO), having an OH number of about 35
Polyol B: a glycerin started propylene oxide/ethylene oxide polyether (87 wt. % PO, 13 wt. % EO), having an OH number of about 28
Polyol C: a tetrafunctional hydroxyl based crosslinker prepared by propoxylating ethylene diamine, having an OH number of about 630
MEOA: monoethanolamine
DEOA: diethanolamine
Diol A: 1,4-butanediol
Diol B: 2-methyl-1,3-propanediol
nBuOH: n-butyl alcohol
Catalyst A: Fomrez UL-28, dimethyltin dilaurate, commercially available from Witco Corp.
Pigment A: a blend of Polyol B (91.1 wt. %) and carbon black (8.9 wt. %)
Pigment B: a blend of Polyol B (72 wt. %) and carbon black (18 wt. %)
Irganox 245: an antioxidant, commercially available from Ciba-Geigy Inc.
Tinuvin 765: an UV stabilizer, commercially available from Ciba-Geigy Inc.
Isocyanate A: a biuret group-containing polyisocyanate prepared from 1,6-hexamethylene diisocyanate and 1,6-hexamethylene diamine, having an isocyanate content of about 23%, a content of monomeric diisocyanate of <0.7% by weight, a viscosity at 25° C. of 1300–2200 mPa.s, and a functionality of about 3.5.
Isocyanate B: an isocyanate prepolymer prepared from 1,6-hexamethylene diisocyanate and 1,3-butanediol, having an isocyanate content of about 18.3%, a content of monomeric diisocyanate of 1.8% by weight, a viscosity at 25° C. of 1360 mPa.s, and a functionality of about 2. See Example 3 in Table 1 for additional details on this isocyanate and its preparation.

Isocyanate C: an isocyanate prepolymer prepared from 1,6-hexamethylene diisocyanate and triethyleneglycol; having an isocyanate content of about 15.8%, a content of monomeric diisocyanate of 0.66%, is solid at 25° C., and having a functionality of about 2. See Example 2 in Table 1 for additional details on this isocyanate and its preparation.

The results of RIM Examples 9–16 are presented in Table 2 below. All of these examples were run at an NCO index of 105. The mold temperatures were as follows:

Examples 9–10: 65° C.
Examples 11–12: 77° C.
Examples 13–16: 80° C.

RIM Examples 9–11 are comparative and Examples 12–16 fall within the scope of the invention. The advantages of using the prepolymer of the invention are seen by comparing the results of the elastomers produced using the higher functionality prepolymer in Examples 9 and 10 (i.e. Isocyanate A having a funtionality >3) vs. those using the linear prepolymer in Examples 12–16. First, the overall physical properties are more balanced (i.e. more isotropic) for the linear prepolymer (i.e. Examples 12–16). In other words, there is less difference between the PA and the PP values. Second, the final elongation of the elastomers is significantly improved in Examples 12–16.

In addition, comparative Example 11 shows the need for the crosslinker in our proprietary B-side blend to yield acceptable greenstrength in elastomers produced from these linear prepolymers.

What is claimed is:

1. A process for the production of polyurethane moldings from a reaction mixture by the reaction injection molding process, wherein said reaction mixture comprises the following components:

A) a hexamethylene diisocyanate prepolymer having a functionality of less than 2.3, an NCO content of 5 to 25%, and a monomer content of less than 2% by weight;

with

B) an isocyanate-reactive component comprising:
b1) from about 20 to 94% by weight, based on the weight of component B) and component C), of at least one organic compound having a molecular weight of from 500 to 10,000, and containing at least about two isocyanate-reactive hydroxyl groups,
b2) from about 5 to 50% by weight, based on the weight of component B) and component C), of at least one organic compound having a molecular weight of from about 61 to 500, and being selected from the group consisting of diols, aminoalcohols, and mixtures thereof, and b3) from about 1 to 20% by weight, based on the weight of component B) and component C), of at least one hydroxyl-based crosslinking compound having a functionality greater than 2, a molecular weight of from about 92 to 500, and containing no more than 1 aliphatic amine hydrogen atom capable of reacting with isocyanate groups;

in the presence of

C) from 0.1 to 10% by weight, based on the weight of component B) and component C), of at least one catalyst comprising

TABLE 2

|  | 9 | 10 | 11 | 12 | 13 | 14 | 15 | 16 |
|---|---|---|---|---|---|---|---|---|
| Polyol Blend | | | | | | | | |
| Polyol A | 69 | 72 | 71 | 71 | 68 | 67 | 67 | 76.5 |
| MEOA | 4 | 4 | 4 | | | 4 | 4 | 12 |
| Pigment B | 4 | 4 | | | | | | |
| Pigment A | | | 1.5 | 1.5 | 1.5 | 1.5 | 1.5 | 1.5 |
| Tinuvin 765 | 3 | 3 | 3 | 3 | 3 | 3 | 3 | 3 |
| Irganox 245 | 1 | 1 | 1 | 1 | 1 | 1 | 1 | 1 |
| Diol A | 17 | 18 | 17.5 | 17.5 | 17.5 | 17.5 | | |
| Catalyst A | 2 | 2 | 2 | 2 | 2 | 2 | 2 | 2 |
| n—BuOH | | 8 | | | | | | |
| Diol B | | | | | | | 17.5 | |
| DEOA | | | | 4 | | 4 | 4 | 4 |
| Polyol C | | | | | 7 | | | |
| Isocyanate | A | A | B | B | B | B | C | C |
| Physicals | | | | | | | | |
| RT Flex (PA) psi | 9,500 | 8,200 | 1,260 | 1,400 | 1,300 | 10,600 | 3,700 | 36,000 |
| RT Flex (PP) | 4,400 | 2,100 | 1,330 | 1,350 | 1,266 | 6,700 | 2,400 | 33,000 |
| Tensile Str (PA) psi | 2,000 | 2,000 | 1,418 | 1,730 | 1,270 | 2,010 | 2,280 | 3,100 |
| Tensile Str (PP) | 1,700 | 1,400 | 1,260 | 1,915 | 1,280 | 2,030 | 1,690 | 1,800 |
| Elongation (PA) % | 75 | 120 | 300 | 250 | 290 | 270 | 180 | 155 |
| Elongation (PP) | 75 | 110 | 310 | 270 | 280 | 270 | 180 | 125 |
| Tear Str (PA) pli | 105 | 320 | 215 | 190 | 160 | 400 | 181 | 432 |
| Tear Str (PP) | 60 | 135 | 210 | 175 | 125 | 370 | 161 | 348 |
| Greenstrength | Very Good | Exc. | Fair | Very Good | Good | Exc. | Very Good | Exc. |

PA = Parallel to flow direction
PP = Perpendicular to flow direction

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

c1) from 0.1 to 10% by weight, based on the weight of component B) and component C), of at least one catalyst selected from the group consisting of metal carboxylates, metal halides, ammonium carboxylates, and mixtures thereof, c2) from 0.0 to 10% by weight, based on the weight of component B) and component C), of at least one tin-sulfur catalyst, and c3) from 0.0 to 10% by weight based on the weight of component B) and component C), of at least one tertiary amine catalyst, and the amount of components c1), c2) and c3) present totals 0.1 to 10% by weight, based on the weight of component B) and component C);

wherein the amount of component B) and component C) totals 100%, and said components are processed via the one-shot process at an isocyanate index of 70 to 130.

2. The process of claim 1 wherein b1) is a polyether polyol and contains about two isocyanate-reactive hydroxyl groups.

3. The process of claim 1 wherein b2) is one diol and one aminoalcohol.

4. The process of claim 1 wherein b2) is at least one aminoalcohol.

5. The process of claim 1 wherein b2) is selected from the group consisting of 1,4-butanediol, 2-methyl-1,3-propanediol, and monoethanolamine.

6. The process of claim 1 wherein b3) is selected from the group consisting of diethanolamine and triethanolamine.

7. The process of claim 1 wherein said hexamethylene diisocyanate prepolymer has a functionality of about 2, an NCO content of about 10–23%, and a monomer content of less than 2%.

8. The process of claim 7 wherein said hexamethylene diisocyanate prepolymer has an NCO content of about 15–21% and a monomer content of less than 1%.

9. The process of claim 1, wherein said reaction mixture comprises from 0.5 to 5% by weight, based on the weight of component B) and component C), of said catalyst.

10. The process of claim 1, wherein said reaction mixture comprises from 1 to 4% by weight, based on the weight of component B) and component C), of said catalyst.

11. The process of claim 1 wherein said catalyst C) comprises:

i) from 0.5 to 5.0% by weight, based on the weight of component B) and component C), of component c1), ii) from 0.0 to 5.0% by weight, based on the weight of component B) and component C), of component c2), and iii) from 0.0 to 5.0% by weight, based on the weight of component B) and component C), of component c3), wherein the amount of components c1), c2), and c3) totals 0.5 to 5.0% by weight, based on the weight of component B) and component C.).

12. The process of claim 1 wherein said catalyst C) comprises i) from 1 to 4.0% by weight, based on the weight of component B) and component C), of component c1), ii) from 0.0 to 4.0% by weight, based on the weight of component B) and component C), of component c2), and iii) from 0.0 to 4.0% by weight, based on the weight of component B) and component C), of component c3), wherein the amount of components c1), c2), and c3) totals 1 to 4% by weight, based on the weight of component B) and component C).

13. The process of claim 11 wherein component c1) is selected from the group consisting of dimethyltin dilaurate, dibutyltin dilaurate, bismuth trineodecanoate, dimethyltin dichloride, trimethylhydroxyethyl-ammonium-2-ethylhexanoate, and mixtures thereof.

14. The process of claim 1, wherein component c1) is selected from the group consisting of dimethyltin dilaurate, dibutyltin dilaurate, bismuth trineodecanoate, dimethyltin dichloride, trimethylhydroxyethyl-ammonium-2-ethylhexanoate, and mixtures thereof.

\* \* \* \* \*